United States Patent [19]

Mitsutake et al.

[11] Patent Number: 5,241,416
[45] Date of Patent: Aug. 31, 1993

[54] SCREEN AND PROJECTOR USING SAID SCREEN

[75] Inventors: Hideaki Mitsutake, Tokyo; Shigeru Kawasaki, Atsugi, both of Japan

[73] Assignee: Canon Kabushiki Kaisha, Tokyo, Japan

[21] Appl. No.: 960,223

[22] Filed: Oct. 13, 1992

Related U.S. Application Data

[63] Continuation of Ser. No. 699,456, May 13, 1991, abandoned.

[30] Foreign Application Priority Data

May 14, 1990 [JP] Japan .................................. 2-121086

[51] Int. Cl.⁵ .............................................. G03B 21/60
[52] U.S. Cl. .................................................. 359/456
[58] Field of Search ................. 359/452, 454, 457, 460

[56] References Cited

U.S. PATENT DOCUMENTS

| | | | |
|---|---|---|---|
| 2,213,077 | 8/1940 | Schwartz | 359/452 |
| 4,219,253 | 8/1980 | Campion et al. | 350/129 |
| 4,501,488 | 2/1985 | Goldsholl | 355/1 X |
| 4,692,015 | 9/1987 | Loce et al. | 355/1 |
| 4,733,096 | 3/1988 | Horiguchi | 355/1 X |

FOREIGN PATENT DOCUMENTS 0118951 9/1984 European Pat. Off. .

OTHER PUBLICATIONS

Patent Abstracts of Japan, vol. 10, No. 101, Nov. 19, 1985 (JP-A-60 232538).
Patent Abstracts of Japan, vol. 13, No. 324, Apr. 12, 1989 (JP-A-1 092733).
Patent Abstracts of Japan, vol. 12, No. 23, Jan. 9, 1988 (JP-A-63 004428).

*Primary Examiner*—Richard A. Wintercorn
*Attorney, Agent, or Firm*—Morgan & Finnegan

[57] ABSTRACT

A screen is constituted of a sheet having a first lens array, and a second lens array formed in the interior of said sheet, wherein each lens of said second lens array is arranged in correspondence with each lens of said first lens array.

55 Claims, 11 Drawing Sheets

SCREEN AND PROJECTOR USING SAID SCREEN

This is a continuation of co-pending application Ser. No. 07/699,456, filed on May 13, 1991, now abandoned.

BACKGROUND OF THE INVENTION

1. Field of the Invention

The present invention relates to a screen and a projector using said screen, and more particularly to a screen having a lenticular sheet and a projector for displaying an image using such screen.

2. Related Background Art

Figure 1:
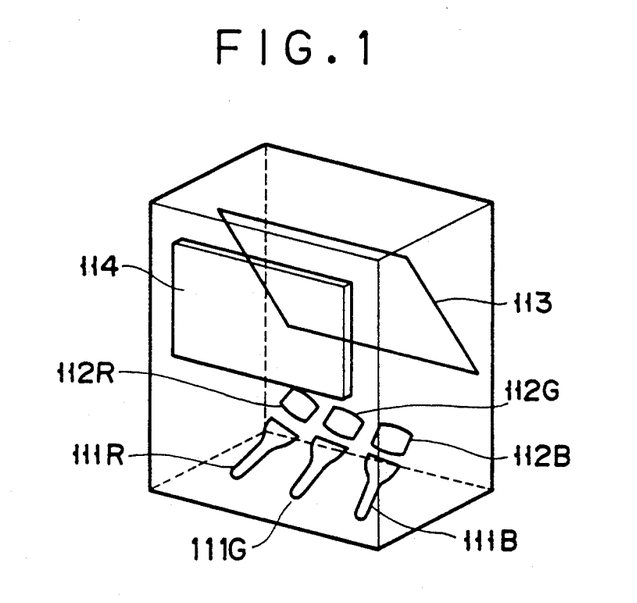
FIGS. 1 and 2 are a perspective view and a side view showing a constituion of conventional example, respectively.
Figure 2:
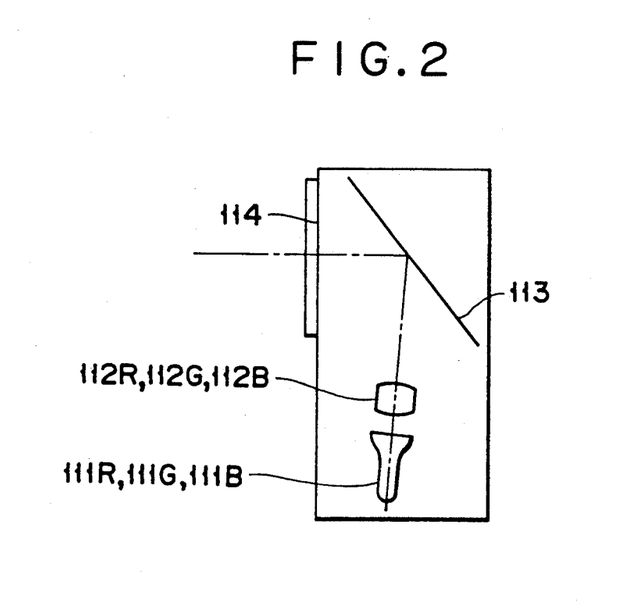
Figure 3:
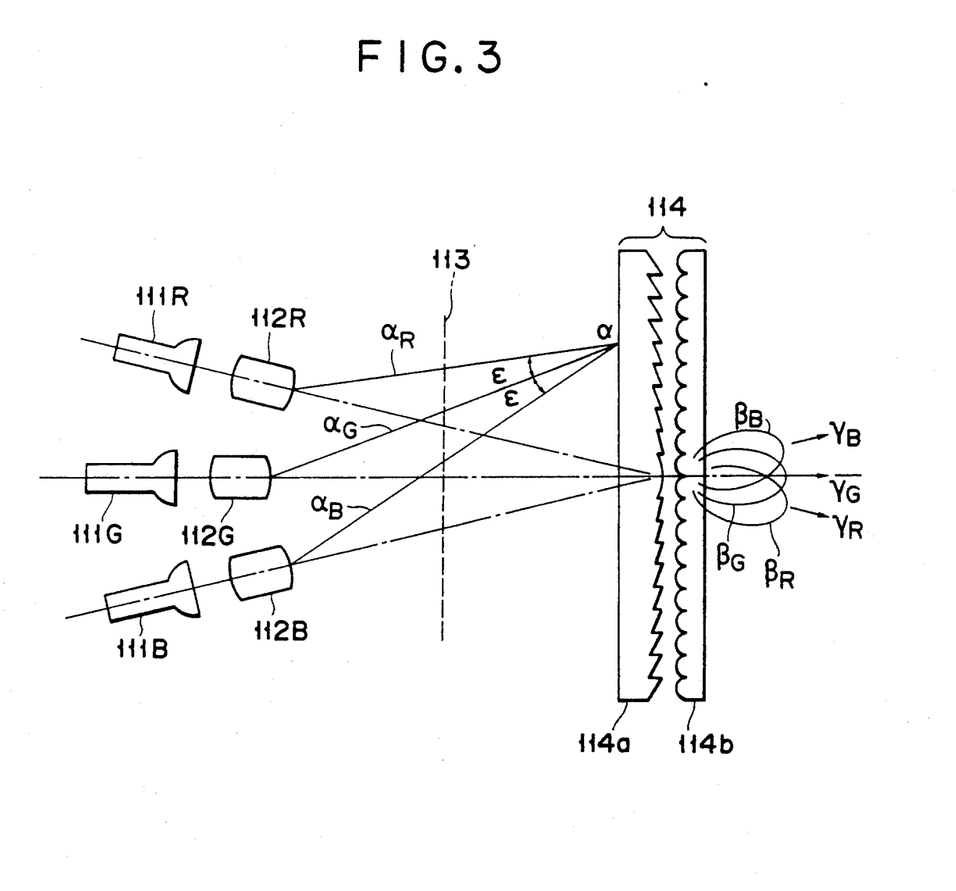
FIG. 3 is a view showing a conventional optical arrangement expanded in a plane.

FIGS. 1 and 2 are a perspective view and a side view showing a rear projection display unit which has been conventionally used, respectively. FIG. 3 shows an optical arrangement of the display unit developed in a plane.

As shown in FIGS. 1 and 2, red, green and blue images displayed respectively on the tube planes of three CRTs 111R, 111G and 111B are magnified and projected via three projection lenses 112R, 112G and 112B, and a reflecting mirror 113, so that a color image built up by the red, green and blue images is displayed on a translucent (or transmissible) screen 114.

The screen 114 is composed of a Fresnel lens plate (sheet) 114a having a function of directing a light from each of projection lenses 112R, 112G, 112B toward the observer and a lenticular lens plate (sheet) 114b having a function of extending the angle of visibility of the unit by diffusing the light, as shown in FIG. 3.

In this display unit, lights $\alpha_R$, $\alpha_G$, $\alpha_B$ reaching an arbitrary point $\alpha$ on the screen 114 are incident at a certain angle $\epsilon$ (thereafter referred to as "convergence angle"). Thereby, lights $\beta_R$, $\beta_G$, $\beta_B$ diffused by the lenticular lens plate 114b have different directions with the most intensive lights $\gamma_R$, $\gamma_G$, $\gamma_B$, depending on the convergence angle of each light $\alpha_R$, $\alpha_G$, $\alpha_B$, so that a phenomenon called a "color shift", in which the color appears to be varied depending on a direction of observation, may occur, causing a degraded image.

As to the lenticular lens plate having a function of eliminating the "color shift", as disclosed in Japanese Laid-Open Patent Application No. 58-134627, there is a method that the shapes of lenses on the incident and emergent surfaces are made aspherical so as to eliminate the color shift with the effects of both aspherical surfaces.

Figure 4:
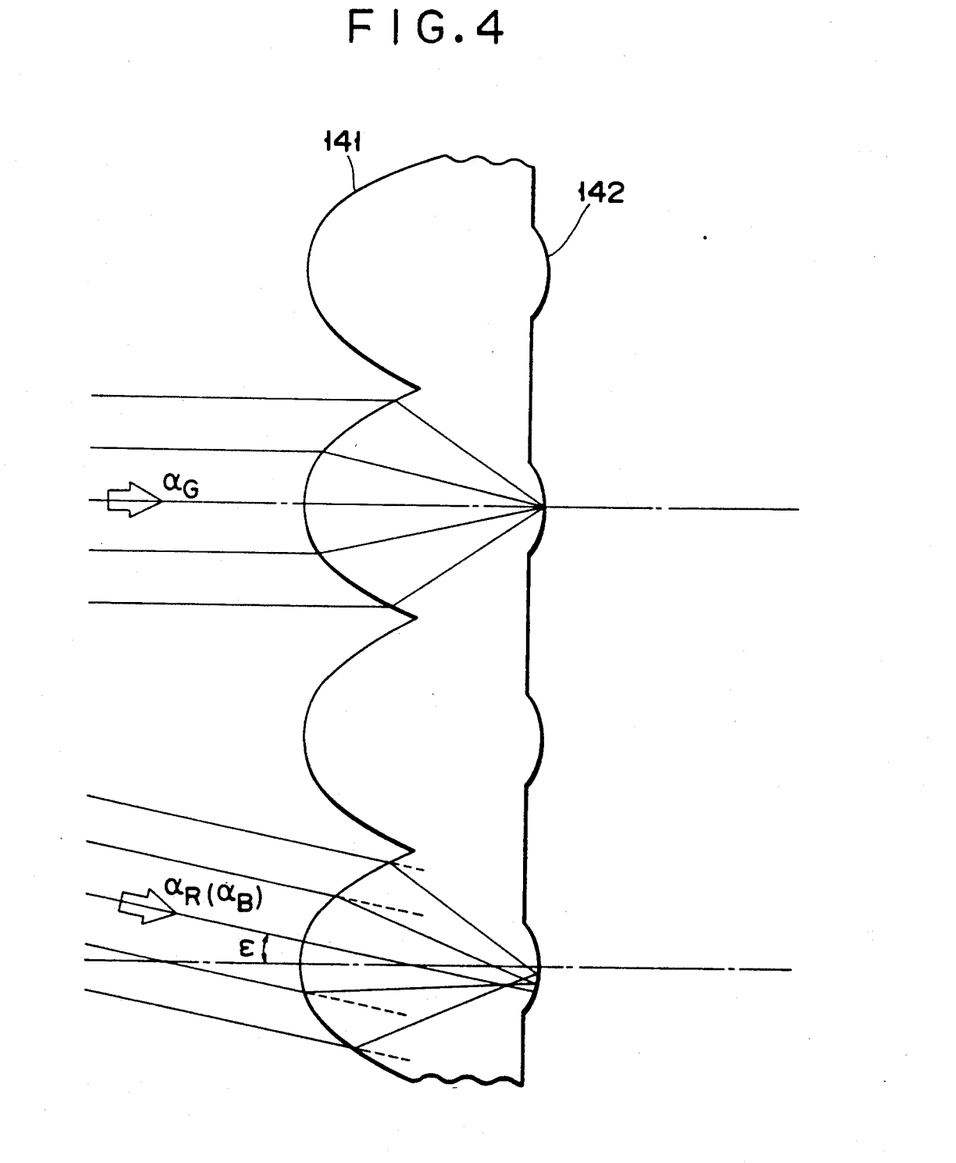
FIG. 4 is a view showing a basic constitution for a conventional lenticular lens.

FIG. 4 is an enlarged view showing a basic construction of the lenticular lens plate as described in the above application.

The lenticular lens plate is a two-sided lenticular lens composed of an incident surface 141 formed of an aspherical lens in or near elliptical shape, and an emergent surface 142 formed of an aspherical lens having a positive power disposed in an area onto which the light beam refracted at the incident surface converges. Each lens on the incident surface 141 has zero spherical aberration by making its eccentricity e an appropriate value ($e = 1/n$) for a refractive index n of plate material, and when the incident angle of a principal light beam onto the lenticular lens plate is zero, as in the case of a light flux from the green light projection lens 112G as shown in FIG. 3, the light beam refracted at the incident surface 141 will converge into one point, at or near which convergent point is disposed the emergent surface 142. On the other hand, the light fluxes from the red and blue projection lenses 112R, 112B having non zero incident angles of principal light beams onto the lenticular lens plate may produce a coma aberration due to refraction at the incident surface 141, and so do not converge into a point on the emergent surface 142.

A mechanism for eliminating the color shift makes use of the displacement of incident position onto the emergent surface 142 which may be caused by the coma aberration. That is, the refractive angle at the emergent surface 142 of principal light beams in light fluxes from the projection lenses 112R, 112B incident onto each point on the emergent surface 142 are adjusted so that the luminance distribution of diffused light formed on the operator side by light flux from the projection lens 112G and that of each of light fluxes from the projection lenses 112R, 112B may coincide. On each point on the emergent surface 142, the orientation of plane can be determined to correspond to the above refractive angle, so that the emergent surface can be shaped by connecting them smoothly.

Figure 5:
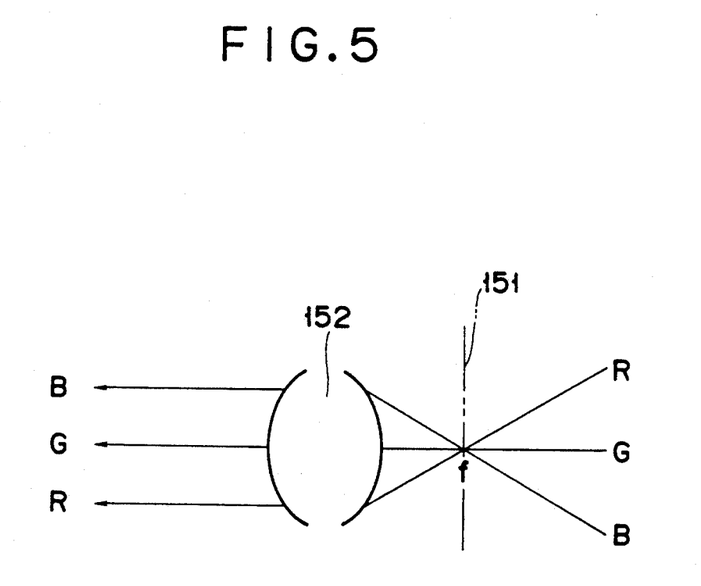
FIG. 5 is a view for explaining a principle of eliminating the color shift in a conventional example.

FIG. 5 is a schematic view for explanation of the principle for eliminating the above color shift by replacement with a telecentric optical system.

An optical system of FIG. 5 places a diaphragm 151 at the focal position of a condenser lens 152, wherein when light beams of three colors R, G, B with equal intensities enter this optical system at different incident angles, each emergent light beam will exit therefrom with equal intensity and direction. This means that the color shift has been eliminated.

With the above method, the color shift can be eliminated.

In order to further enlarge the angle of visibility with the above lenticular lens plate, the effective width of lens on the incident surface 141 must be extended. Accordingly, with a wider angle of visibility, the distance between incident and emergent surfaces (plate thickness) for a lens pitch of the lenticular lens plate is correspondingly reduced. For example, to obtain an angle of visibility (half band width) of 40°, the plate thickness for the lenticular lens plate must be thinned up to a pitch of lens for the lenticular lens plate.

With the restriction, the screen for high definition image display unit such as HDTV (a pitch of 0.4 mm for the lenticular lens is necessary for a horizontal resolution of 1000 lines and a screen size of 40 inches (aspect ratio 9:16)) may require a very thin lenticular lens plate, thereby causing a lack of mechanical strength.

Also, the screen of high definition has a disadvantage that owing to finer pitch of lens, blinding due to dust and dirt may easily occur, which requires to perform the maintenance.

SUMMARY OF THE INVENTION

In view of the foregoing conventional problems, the present invention provides an improved screen and an improved projector.

A first form of a screen according to the present invention is characterized by comprising a sheet and forming a lens array in the interior of said sheet.

A second form of a screen according to the present invention is characterized by having a sheet with a first lens array, forming a second lens array in the interior of said sheet, and arranging each lens of said second lens array in correspondence with each lens of said first lens array.

A third form of a screen according to the present invention is characterized in that in the screen having a lenticular lens sheet, a plurality of cylindrical lenses are formed in the interior of said sheet, each of said plurality of cylindrical lenses is arranged in correspondence with each lens of said lenticular lens, and the generating line direction for each of said plurality of cylindrical lenses is substantially coincident with that for each lens of said lenticular lens.

A fourth form of a screen according to the present invention is characterized in that in the screen having a lenticular lens sheet, a plurality of cylindrical lenses are formed in the interior of said sheet, each of said plurality of cylindrical lenses is arranged in correspondence with each lens of said lenticular lens, and the generating line direction for each of said plurality of cylindrical lenses is substantially coincident with that for each lens of said lenticular lens.

A first form of a projector according to the present invention is characterized by comprising means for projecting an image and a screen for receiving said image, and wherein said screen comprises a sheet having a lens array in the interior thereof.

A second form of a projector according to the present invention is characterized by comprising means for projecting an image and a screen for receiving said image, and wherein said screen comprises a sheet having a first lens array, which sheet has a second lens array in the interior thereof, each lens of said second lens array being arranged in correspondence with each lens of said first lens array.

A third form of a projector according to the present invention is characterized by comprising means for projecting an image and a screen for receiving said image, and wherein said screen comprises a Fresnel lens sheet and a lenticular lens sheet in order from the side of said projecting means, said Fresnel lens sheet allowing a principal light beam of flux showing said image from said projecting means to be made approximately parallel light and directing the light flux showing said image to said lenticular lens sheet, and wherein said lenticular lens sheet causes the light flux showing said image to be diffused at least within a horizontal surface, and said lenticular lens sheet has a first cylindrical lens array on a surface opposed to said Fresnel lens sheet and a second cylindrical lens array in the interior thereof, with each lens of said second cylindrical lens array being arranged in correspondence with each lens of said first cylindrical lens array.

An example illustrating other form and specific constitution for a screen and a projector according to the present invention will be described in the following, but the present invention is not limited to that example, in which various forms of screen and projector can be provided based on a concept of the present invention.

DESCRIPTION OF THE PREFERRED EMBODIMENTS

An example of a translucent (or transmissible) screen as disclosed below is one having a lenticular lens sheet for diffusing the light in a horizontal direction, in which the lenticular lens sheet comprises a first lens structure (lens array) for causing the refractive action of a positive power and a second lens structure (lens array) provided along a travelling direction of the incident light, with the second lens structure being formed in the interior of the lenticular lens sheet.

As the first lens structure, an aspherical shaped lens form is shown in which the curvature gradually increases from the optical axis to the outside thereof, such as stretching an incident surface in a direction of optical axis. Also, as the second lens structure, there are shown a form of having bar-like core portions embedded which are formed of a material of higher refractive index than a material of sheet for defining the incident and emergent surfaces in the interior of the lenticular lens sheet, and a form of having an array of bar lenses of the refractive index distribution type which can be commonly used for the first and second lens structures and setting the first lens structure on an incident surface of lenticular lens sheet.

The light incident upon an incident surface of the lenticular lens sheet passes through the first and second lens structures, and exits in diffused ray from an emergent surface of sheet. As both the first and the second lens structures produce the positive power refractive index action, the above incident light is converged by the first lens structure if the first lens structure is formed on the incident surface, and further converged in passing through the second lens structure formed in the interior of lenticular lens, so that it exits in diffused state from the emergent surface. Thereby, it is possible to emanate the emergent light in wide angular range regardless of the plate thickness of lenticular lens sheet. As this emergent surface may not (or may) give the lens action, it can be formed flat. Since the refractive angle of light beam at the second lens structure is different depending on the incident position of light beam onto the second lens structure, it is also possible to make the incident lights in parallel form and emanate them, when a plurality of incident lights (e.g., light for each color of R, G, B) enter the lenticular lens at different angles.

When a projection type display unit is constituted with this lenticular lens, a wide angle of visibility can be obtained with the above action and the color shift is not produced.

Also, in the present invention, a construction can be adopted in which the first lens structure is formed on the emergent surface side of lenticular lens sheet, and the incident surface of lenticular lens is formed flat. And a further construction can be adopted in which the first lens structure is formed in the interior of lenticular lens sheet.

Figure 6:
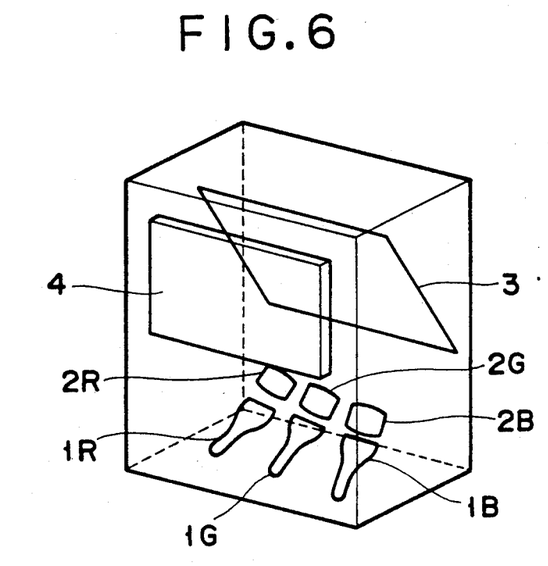
FIGS. 6 and 7 are a perspective view and a side view showing a consitution of a first example according to the present invention, respectively.
Figure 7:
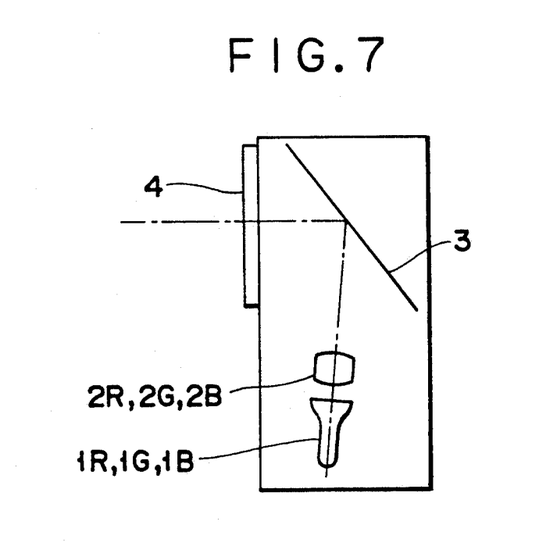
Figure 8:
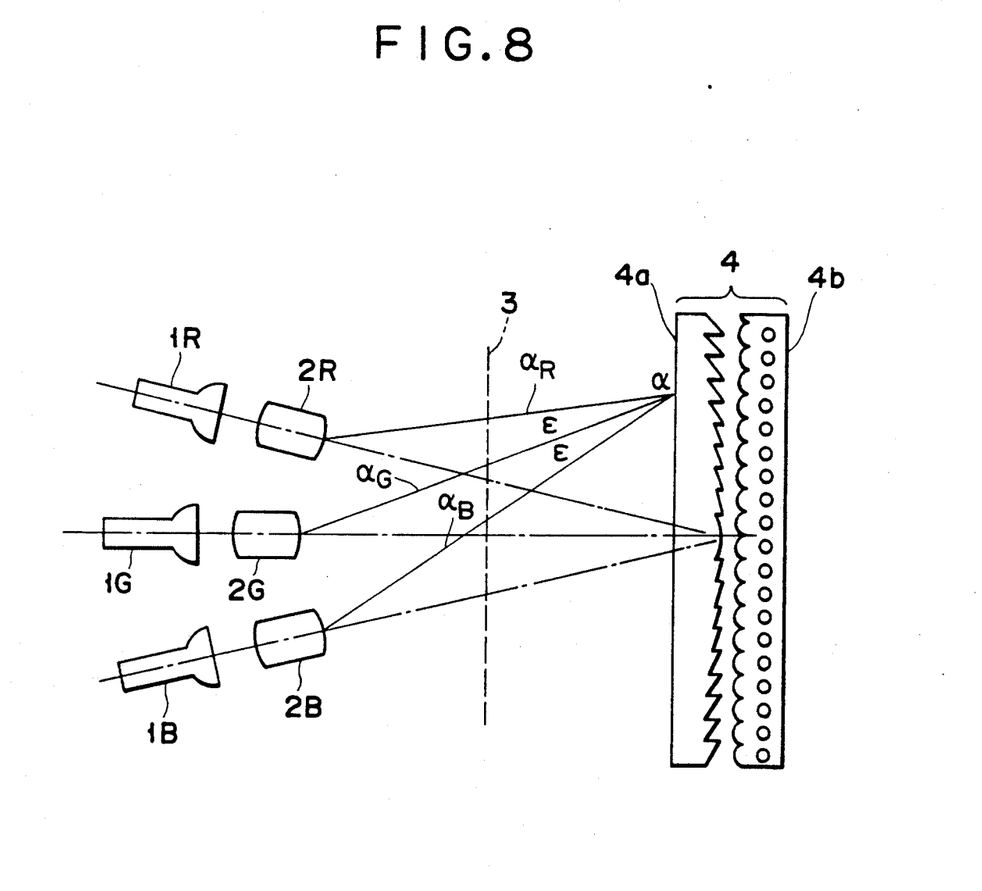
FIG. 8 is a view showing an optical arrangement of the first example expanded in a plane.

FIGS. 6 and 7 are a perspective view and a side view showing the constitution of an example of a rear projection display unit according to the present invention, respectively. FIG. 8 shows an optical arrangement of the rear projection display unit expanded in a plane.

As shown in FIGS. 6 and 7, red, green and blue images displayed respectively on tube planes of three CRTs, 1R, 1G and 1B are magnified and projected via three projection lenses 2R, 2G and 2B and a reflecting mirror 3, so that a color image built up of red, green and blue images is displayed on a translucent screen 4.

The screen 4 is composed of a Fresnel lens plate (sheet) 4a having a function of directing a light from each of projection lenses 2R, 2G, 2B toward the observer and a lenticular lens plate (sheet) 4b having a function of extending the angle of visibility of the unit by diffusing the light, as shown in FIG. 8.

In this display unit, the lights $\alpha_R$, $\alpha_G$, $\alpha_B$ reaching an arbitrary point $\alpha$ on the screen are incident thereon at a certain angle $\epsilon$ (thereafter referred to as "convergence angle"). For example, when three CRT tubes 1R, 1G, 1B having a diagonal screen size of 7 inches (aspect ratio 3:4) are juxtaposed, the pupil center distance for each projection lens 2R, 2G, 2B is about 150 mm. Accordingly, the projection distance is 800 mm (the maximum angle of view for the projection lens is about 33 degrees in a diagonal display screen size of 40 inches), the convergence angle $\epsilon$ on a central portion of screen is about 10 degrees.

Figure 9:
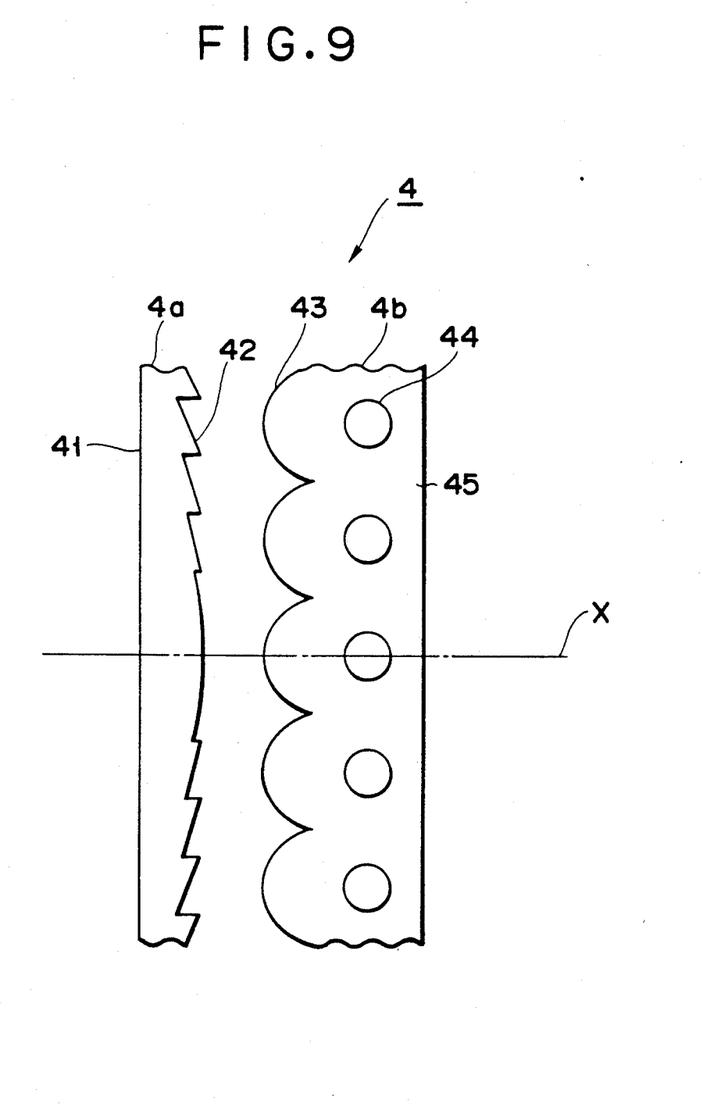
FIG. 9 is an upper view for explaining in detail the constitution of a screen 4 as shown in FIG. 6.

FIG. 9 is an upper view for explaining in detail the constitution of a screen 4.

A Fresnel lens plate 4a constituting the screen 4 is constructed of an incident surface 41 of plane and an emergent surface 42 of Fresnel lens plane. The focal distance of the Fresnel lens plate 4a is approximately equal to a distance between each of projection lenses 2R, 2G, 2B and the screen 4, so that each light flux (principal light beam) exapanding all over the screen from each projection lens 2R, 2G, 2B is deflected to be approximately parallel to the optical axis X of lenticular lens 4b. The Fresnel lens plate 4a is made of a plastic material such as acrylic or polycarbonate.

An incident surface 43 of lenticular lens plate 4b as shown in FIG. 9 is of aspherical shape producing the refractive action of positive power, like a conventional incident surface 141 as shown in FIG. 4, and is constructed of the incident surface 43 formed as the first lens structure (cylindrical lens array), an array of cylindrical core portions 44 that is the second lens structure (cylindrical lens array), which is arranged in the area onto which each light beam refracted at the incident surface 43 is converged, made of a homogeneous medium with higher refractive index than that of peripheral member and can produce the refractive action of positive power, and an emergent surface 45 which is a flat plane. The light flux deflected by the Fresnel lens plate 4a enter the lenticular lens plate 4b over the whole area on the screen, in approximately parallel to the above optical axis X for the principal light beam from the green projection lens 2G, or in the direction oblique to the optical axis (i.e., with some convergence angle) for the principal light beams from the red or blue projection lenses 2R, 2B.

Figure 10:
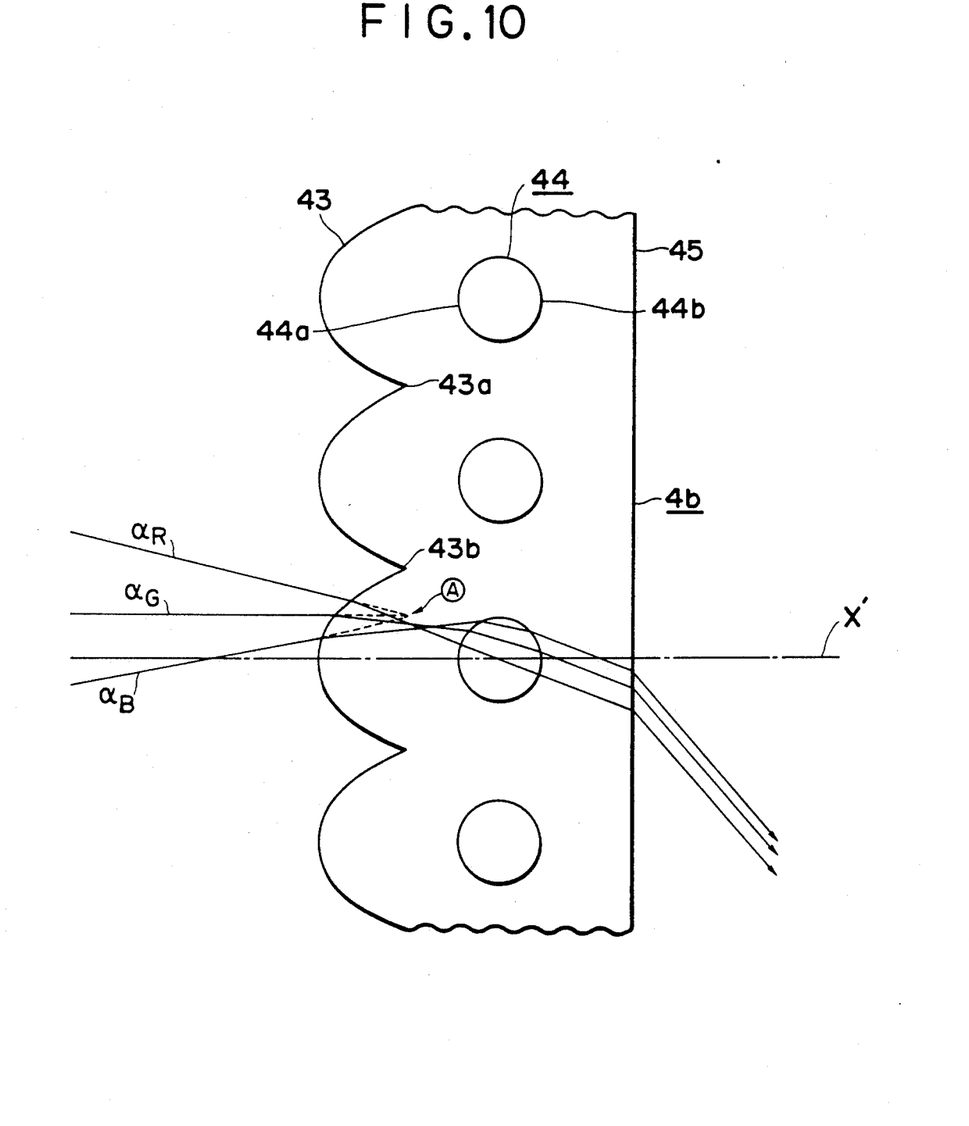
FIG. 10 is a partial enlarged view for explaining the constitution of a lenticular lens 4b as shown in FIG. 9.

FIG. 10 is a partially enlarged view for explaining the constitution of a lenticular lens 4b, wherein one optical path is illustrated for each principal light beam $\alpha_R$, $\alpha_G$, $\alpha_B$ of the image forming light flux from each projection lens 2R, 2G, 2B.

Firstly, considering the green light $\alpha_G$ which is parallel to the optical axis X', it is refracted at the incident surface 43, further refracted at the interfaces 44a, 44b of a core portion 44, finally refracted at the emergent surface 45, and exits therefrom. The above four refractive surfaces have all the deflection action for deflecting the incident light in a direction of optical axis. And the light converging action with the three surfaces except for the emergent surface 45 allows for a screen having the wide angle of visibility. Particularly, as the refractive power can be dispersed with these three surfaces, unlike a two-sided lenticular lens as shown in the conventional example, a refractive surface for the wide angle of visibility can be constructed without difficulty.

Next, the color shift eliminating function of this example will be described.

In the lenticular lens 4b, the surface containing junction points 43a, 43b between adjacent lenses on the incident surface 43 is a diaphragm (or iris) position for a unit of lens. This diaphragm position is almost coincident with a focal position of the core portion 44 (lens). Each light beam (principal light beam) $\alpha_R$, $\alpha_G$, $\alpha_B$ is selected so that the extension line of each light beam can pass through a point ⒶA on the diaphragm. The light beams $\alpha_R$, $\alpha_G$, $\alpha_B$ have the incident angles increasing in the order of $\alpha_R$, $\alpha_G$, $\alpha_B$ for an interface 44a on the incident side of the core portion 44 with higher refractive index, and also the deflection angles of the core portion 44 increasing in the order of $\alpha_R$, $\alpha_G$, $\alpha_B$. Accordingly, differences between $\alpha_R$, $\alpha_G$, $\alpha_B$ in the travelling direction become smaller. An interface 44b on the emergent side has the similar effects, so that it is possible to make almost parallel the travelling directions of three color light beams $\alpha_R$, $\alpha_G$, $\alpha_B$ due to the action of the interfaces 44a, 44b of the core portion with higher refractive index. The above effects come true for the light beam passing through all points on the diaphragm surface. Accordingly, the distributions of the angle of visibility in the emergent light beams $\alpha_R$, $\alpha_G$, $\alpha_B$ are made equal to each other, so that the color shift of the unit can be eliminated.

The above color shift eliminating mechanism will be described on principle.

Figure 11:
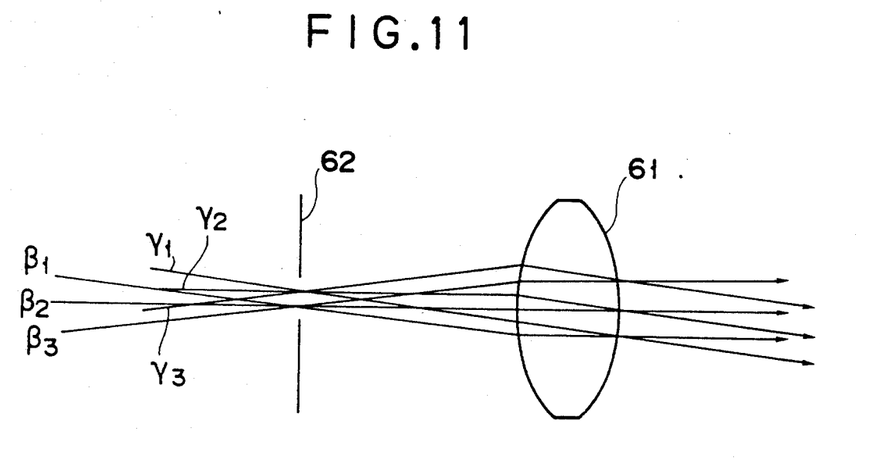
FIG. 11 is a view showing an optical principle for explaining a color shift eliminating mechanism in the first example.

As shown in FIG. 11, in a telecentric optical system where a diaphragm 62 is placed at a focal position of a convex lens 61, the light fluxes $\beta_1$, $\beta_2$, $\beta_3$ incident at angles upon a point of the diaphragm 62 exit therefrom in parallel to each other with the action of the convex lens 61. The points $\gamma_1$, $\gamma_2$, $\gamma_3$ lying outside of an axis on the diaphragm 62 also come true. In the lenticular lens plate 4b of the present invention, a surface connecting junction points 43a, 43b of adjacent lenses on the incident surface 43 may correspond to the above diaphragm plane 62, and the core portion 44 with higher refractive index may correspond to the convex lens 61.

As a material of the lenticular lens plate 4b, for example, the portion except for the core portion 44 with higher refractive index is constructed of an acrylic material having a refractive index of about 1.5, and the core portion with higher refractive index is constructed of a polycarbonate material having a refractive index of about 1.6. But it will be understood that the material is not limited to the above type. Accordingly, it is possible to use a glass material rather than plastic.

Figure 12:
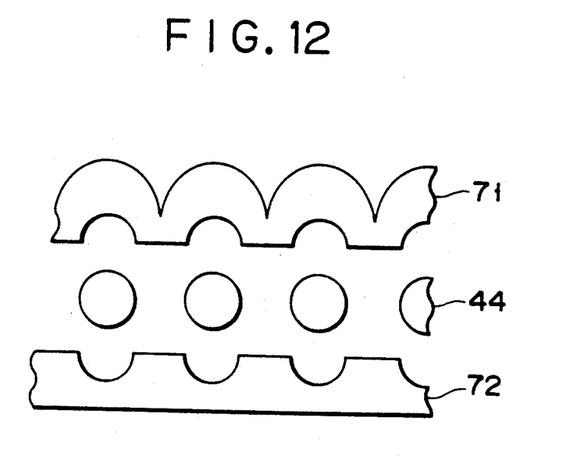
FIG. 12 is a view for explaining an example of method for fabricating the lenticular lens plate 4b as shown in FIG. 9.

One method of manufacturing a lenticular lens plate 4b can be conceived in which it is formed by bonding mutually three portions of a first member 71 of meniscus cylindrical lens array, a second member 72 of flat concave cylindrical lens array and a plurality of cylindrical core portions 44, as shown in FIG. 12, for example.

With the lenticular lens plate 4b of the present invention, as the emergent surface 45 is a plane, its action for the light beam is not changed in whatever position the emergent surface may be placed in accordance with the thickness of lenticular lens plate. Accordingly, the plate thickness can be obtained with sufficient mechanical strength.

Also, the screen 4 of the present invention is a combination of a Fresnel lens plate 4a whose incident surface is a plane and a lenticular lens plate 4b whose emergent surface is a plane, so that the screen with easy maintenance can be constructed because of the planes at both sides.

Figure 13:
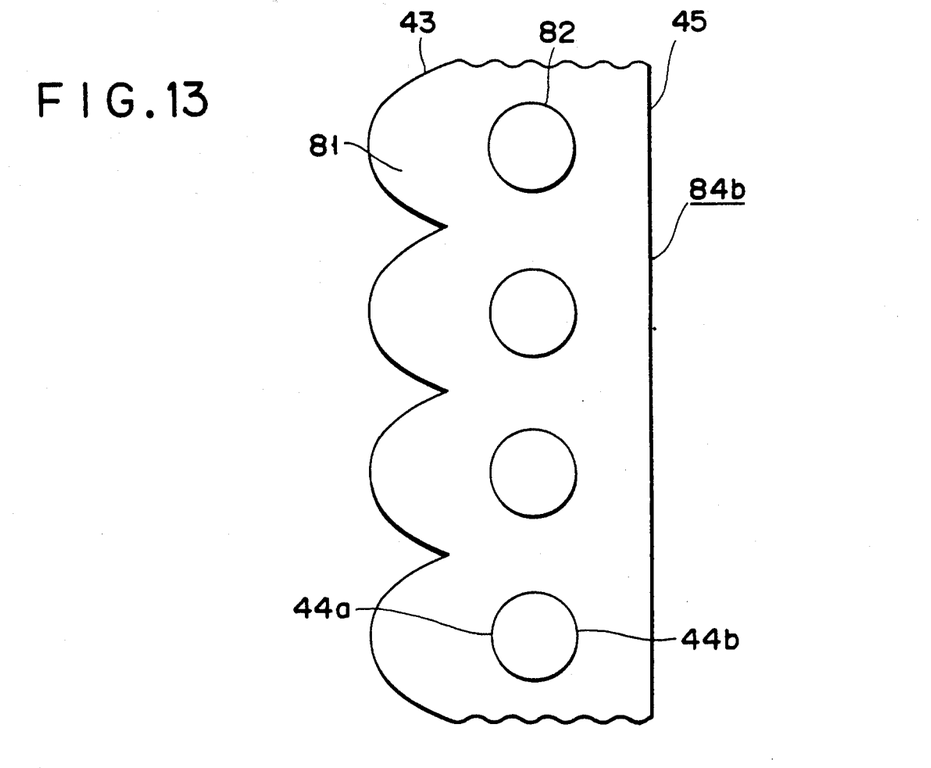
FIG. 13 is a view showing the constitution of essential parts in a second example according to the present invention.
Figure 14:
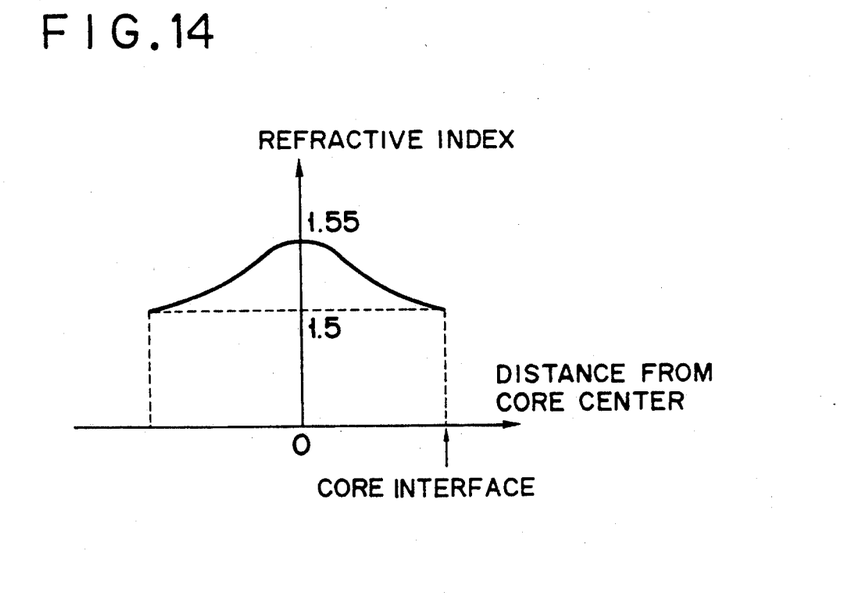
FIG. 14 is a view showing a distribution of refractive index in the direction symmetrical to the central axis of a core portion 72 as shown in FIG. 12.

FIG. 13 is an enlarged upper view showing the constitution of essential parts for a lenticular lens plate in a second example according to the present invention, and FIG. 14 is a view showing a distribution of refractive index in the direction (radial direction) symmetrical to the central axis (optical axis) for a cylindrical core portion 82 as shown in FIG. 13. A lenticular lens plate 84b of this example is one as used for the projection type display unit, in place of the plate 4b of previous example.

In this example, the cylindrical core portion 82 embedded into the lenticular lens plate 84b is one as partially formed of a material with higher refractive index, which has different refractive index or the distribution of refractive index. As the constituion except for the lenticular lens 84b is the same as that shown in FIGS. 8 and 9, and so the detail explanation will be omitted.

The lenticular lens 84b is constructed of clad portions 81 made of an acrylic material with a refractive index of 1.5, and core portions 82 of refractive index distribution type with a central refractive index of 1.55 and a peripheral refractive index of 1.5. An optical material for such a core portion 82 is, for example, one obtained by diffusing a fluorine monomer in a polymer of diallyl phthalate (refractive index of 1.57 for polymer).

While the first example has the refractive action only on the interfaces 44a, 44b of core portion, it is possible in this example to avoid the color shift which can not sufficiently eliminated with the core portion made of uniform medium in such a manner as to increase the refractive effect for the light beam passing through central region of the core portion 82 or the refractive power in intermediate region of the core portion 82 by controlling the refractive index within core portion to be variable.

Figure 15:
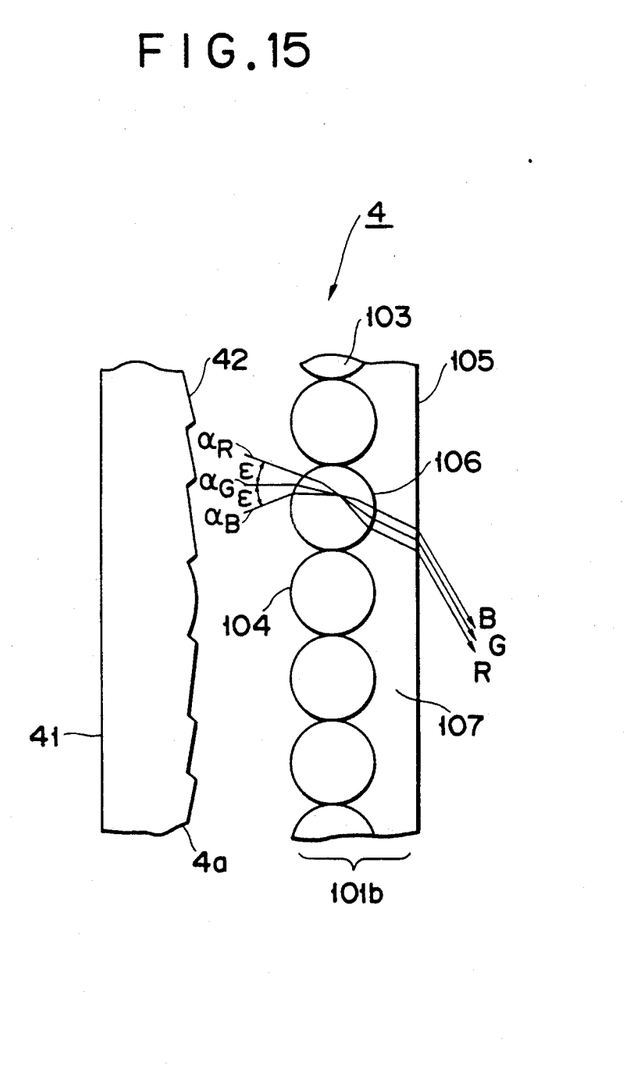
FIG. 15 is an upper view showing a constitution of essential parts in a third example according to the present invention.

FIG. 15 is an upper view showing the constitution of essential parts for a screen in a third example according to the present invention. This screen is also provided on the projection type display unit as shown in FIG. 8. In the figure, 4a is a Fresnel lens plate, as shown in the first example, which is constructed of an incident surface 41 formed as the plane and an emergent surface 42 formed as the Fresnel lens. The focal distance of this Fresnel lens plate 41 is approximately equal to a distance from each projection lens to the screen, as previously described, so that the principal light beam of flux diffusing from each projection lens to the entire screen is made approximately parallel light flux. 101b is a lenticular lens plate, including the cylindrical lenses 103 of refractive index distribution type provided on the side of the incident surface, the emergent surface 105 being processed as flat, and a clad portion 107 formed of a material of lower refractive index than central refractive index of the cylindrical lenses 103. Among the light fluxes deflected by the Fresnel lens plate 101a, the principal light beam $\alpha_G$ for green light is incident in parallel to the optical axis of lenticular lens plate 101b, and each of the principal light beams $\alpha_R$, $\alpha_B$ for red and blue lights is incident at a convergence angle $\epsilon$ with respect to the optical axis of lenticular lens plate 101b.

The refractive index distribution for the cylindrical lens 103 in this example has the same refractive action as that for a cylindrical lens on the incident surface 43 and a core portion 44 in the first example (see FIG. 10), in which an array of cylindrical lenses 103 can be used as both the first lens structure and the second lens structure. Therefore, each of incident light fluxes R, G, B can be sequentially converged in order due to the refractive action with a refractive index distribution at least in the interior of cylindrical lens 103, and with the difference of refractive index at the emergent surface 105, so that an appropriate angle of visibility extended over wide visible area can be obtained.

Next, the color shift eliminating mechanism in this example will be described. This principle is the same as that for the telecentric optical system as shown in FIG. 11. The incident surface 104 of the lenticular lens 101b corresponds to the diaphragm 62 as shown in FIG. 11, and is positioned approximately at the focal point on the interface 106 constituting a lens of the second lens structure. The explanation is given qualitatively in the following.

The light beams $\alpha_R$, $\alpha_B$ are incident upon the incident surface 104 at a convergence angle $\beta$ with respect to the light beam $\alpha_G$. Due to the refractive index distribution of positive power in the interior of the cylindrical lens 103, each incident light beam $\alpha_R$, $\alpha_G$, $\alpha_B$ has the deflection angle continuously changed in the interior of cylindrical lens 103 so that mutual differences between the light beams $\alpha_R$, $\alpha_G$, $\alpha_B$ in the travelling direction may become smaller in accordance with the incident angle and position on to the lens 103. Further, light beams $\alpha_R$, $\alpha_G$, $\alpha_B$ have different deflection angles at the interface 106 with the refractive action at the interface 106, depending on the incident angle upon the interface 106, so that the respective travelling directions after exiting from the interface 106 are made almost coincident, and the color shift can be eliminated.

It is noted that instead of the cylindrical lenses 44, and the cylindrical lenses 82, 103 of refractive index distribution type in the above example, spherical lenses of refractive index distribution type can be laid therein, in which each incident light flux R, G, B can be diffused upward and downward, left and right, and therefore, over a further wider visible area. Also, it can be similarly conceived that the incident surface 43 is constituted of lens elements of rotation symmetry, rather than cylindrical lenses.

While in the above example, the face shape of core portion in the lenticular lens is shown as a cylindrical shape having a spherical surface in view of easy manufacture, it should be also noted that the face shape may be satisfied with a curved surface symmetrical with respect to the optical axis, and the degree of freedom in controlling the light beam can be improved if the face shape is made aspherical. It is also sufficient that the lenticular lens may be formed as follows.

(1) Absorption zone such as black longitudinal stripes is partially formed in an area where image light will not pass through on an emergent surface of lenticular lens.

(2) The emergent surface of lenticular lens is processed for nonglare (irregularity processing).

(3) The emergent surface of lenticular lens is processed to be unreflecting.

When the emergent surface of lenticular lens is partially formed with an absorption zone as indicated by (1), the visibility of image can be improved because the reflective light at the emergent surface of screen is reduced so that the disturbance light is prevented from entering the interior of screen. When the nonglare processing as indicated by (2) is performed, the Visibility of image can be also improved because the disturbance light is scattered. When the unreflecting processing as indicated by (3) is performed, the visibility can be also improved because the emergent light is prevented from reflecting upon the emergent surface, and flare is prevented from occurring with the Fresnel lens.

Moreover, while in each example, the core portion is described as having the convergence action to the same optical axis as that for the lens of lenticular lens sheet, it can be appreciated that the visibility can be further improved by displacing the optical axis of each lens relatively depending on the illuminating position of the incident light on to the screen, and such a constitution may be also permitted.

While in each example, the first lens structure is described as being formed on the side of an incident surface of lenticular lens sheet, it can be also realized that the first lens structure is formed on the side of an emergent surface of lenticular lens, and the incident surface of sheet may be formed flat. Also, it is conceived that the first lens structure is formed in the interior of sheet, and the incident and emergent surfaces may be formed flat.

We claim:

1. A screen comprising:
a sheet having a first lens array; and
a second lens array formed in the interior of said sheet, with each lens of said second lens array being arranged in correspondence with each lens of said first lens array.

2. A screen according to claim 1, wherein each lens of said first and second lens array has a positive power.

3. A screen according to claim 2, wherein each lens of said first and second lens array is composed of a cylindrical lens.

4. A screen according to claim 3, wherein said first lens array is formed on a surface of said sheet.

5. A screen according to claim 4, wherein each lens of said first lens array has a refractive surface formed as aspherical.

6. A screen according to claim 5, wherein each lens of said first lens array has a refractive surface of a shape whose curvature gradually increases in leaving away from the optical axis of each lens.

7. A screen according to claim 3, wherein each lens of said second lens array is composed of a biconvex lens.

8. A screen according to claim 7, wherein each lens of said second lens array is made of a medium having a refractive index distribution.

9. A screen according to claim 3, wherein said sheet has an array of a plurality of biconvex cylindrical lenses and a transparent member bonded on said array so as to cover one surface of said array, and wherein said first lens array is constituted of the other surface of said array, and said second lens array is constituted of said one surface of said array.

10. A screen according to claim 9, wherein each cylindrical lens of said array is made of a medium having a refractive index distribution.

11. A screen according to claim 3, wherein the optical axis of each lens in said first lens array and that of each lens in said second lens array are made coincident with each other.

12. A screen according to claim 11, wherein said first lens array and said second lens array constitute a substantially telecentric system on the light emergent side.

13. A screen having a lenticular lens sheet characterized in that:
a plurality of cylindrical lenses are formed in the interior of said sheet;
each of said plurality of cylindrical lenses is arranged in correspondence with each lens of said lenticular lens; and
the generating line direction for each of said plurality of cylindrical lenses is substantially coincident with that for each lens of said lenticular lens.

14. A screen according to claim 13, wherein said lenticular lens and said plurality of cylindrical lenses constitute a substantially telecentric system on the light emergent side.

15. A screen according to claim 13, wherein each lens of said lenticular lens has a refractive surface whose curvature gradually increases it leaves away from the optical axis of each lens.

16. A screen according to claim 13, wherein the refractive index of each of said plurality of cylindrical lenses is greater than that of said sheet.

17. A screen according to claim 13, wherein the medium of each of said plurality of cylindrical lenses has a refractive index distribution.

18. A screen according to claim 13, wherein the optical axis of each lens of said lenticular lens and that of each lens of said plurality of cylindrical lenses are substantially coincident with each other.

19. A screen having a biconvex lenticular lens sheet characterized in that:
a transparent member is bonded on said sheet so as to cover one surface of said sheet; and
the refractive index of said member is smaller than that of said sheet.

20. A screen according to claim 19, wherein a surface of said transparent member is substantially flat on the opposite side to said sheet.

21. A screen according to claim 19, wherein said sheet comprises a plurality of biconvex cylindrical lenses arranged therein.

22. A screen according to claim 19, wherein the medium of said sheet has a refractive index distribution.

23. A screen according to claim 19, wherein said biconvex lenticular lens constitutes a substantially telecentric system on the light emergent side.

24. A screen having a sheet in which a lens array is formed, characterized in that said lens array is disposed in the interior of said sheet and the surroundings of each lens of said lens are covered with the material constituting said sheet wherein the refractive index of said lens array is greater than that of said material constituting said sheet.

25. A screen according to claim 24, wherein said sheet comprises another lens array on a surface, with each lens of said lens array being arranged in correspondence with each lens of said another lens array.

26. A screen according to claim 24, comprising a Fresnel lens sheet.

27. A projector comprising:
   means for projecting an image; and
   a screen for receiving said image, and wherein said screen has a sheet having a first lens array, said sheet has a second lens array in the interior thereof, and each lens of said second lens array is arranged in correspondence with each lens of said first lens array.

28. A projector according to claim 27, wherein said first lens array is formed on a surface of said sheet on the side of said projecting means.

29. A projector according to claim 27, wherein said screen comprises a Fresnel lens sheet on the side of said sheet closer to said projecting means, said Fresnel lens sheet allowing the principal light beam of flux showing said image from said projecting means to be parallel light and to enter said first lens array.

30. A projector according to claim 29, wherein each lens of said first and second lens array is composed of a cylindrical lens.

31. A projector according to claim 30, wherein each lens of said first lens array has a refractive surface formed as aspherical surface.

32. A projector according to claim 31, wherein each lens of said first lens array has a refractive surface of a shape whose curvature gradually increases as it leaves leaving away from the optical axis of each lens.

33. A projector according to claim 30, wherein each lens of said second lens array is composed of a biconvex lens.

34. A projector according to claim 30, wherein each lens of said second lens array is made of a medium having a refractive index distribution.

35. A projector according to claim 30, wherein said sheet has an array of a plurality of biconvex cylindrical lenses and a transparent member bonded on said array so as to cover one surface of said array, and wherein said first lens array is constituted of the other surface of said array, and said second lens array is constituted of said one surface of said array.

36. A projector according to claim 35, wherein each cylindrical lens of said array is made of a medium having a refractive index distribution.

37. A projector according to claim 30, wherein said first lens array and said second lens array constitute a substantially telecentric system on the light emergent side.

38. A projector according to claim 37, wherein the optical axis of each lens of said first lens array and that of each lens of said second lens array are substantially coincident with each other.

39. A projector comprising:
   means for projecting an image; and
   a screen for receiving said image, and wherein said screen comprises a Fresnel lens sheet and a lenticular lens sheet in order from the side of said projecting means, said Fresnel lens sheet allowing the principal light beam of flux showing said image from said projecting means to be parallel light, and directing the light flux showing said image on to said lenticular lens sheet, and wherein said lenticular lens sheet allows the light flux showing said image to be diffused at least within a horizontal surface, and said lenticular lens sheet has a first cylindrical lens array on a surface of said Fresnel lens sheet side, and a second cylindrical lens array in the interior thereof, each lens of said cylindrical lens array being arranged in correspondence with each lens of said first cylindrical lens array.

40. A projector according to claim 39, wherein said projecting means comprises at least three projecting optical systems for projecting each image of red, green and blue on to said screen.

41. A projector according to claim 40, wherein each lens of said first cylindrical lens array has a refractive surface formed as aspherical surface.

42. A projector according to claim 41, wherein each lens of said first cylindrical lens array has a refractive surface of a shape whose curvature gradually increases as it leaves away from the optical axis of each lens.

43. A projector according to claim 40, wherein each lens of said second cylindrical lens array is composed of a biconvex lens.

44. A projector according to claim 40, wherein each lens of said second cylindrical lens array is made of a medium having a refractive index distribution.

45. A projector according to claim 40, wherein said lenticular lens sheet has an array of a plurality of biconvex cylindrical lenses and a transparent member bonded on said array so as to cover one surface of said array, and wherein said first cylindrical lens array is constituted of the other surface of said array, and said second cylindrical lens array is constituted of said one surface of said array.

46. A projector according to claim 45, wherein each biconvex cylindrical lens of said array is made of a medium having a refractive index distribution.

47. A projector according to claim 40, wherein said first cylindrical lens array and said second cylindrical lens array constitute a substantially telecentric system on the light emergent side.

48. A projector according to claim 47, wherein the optical axis of each lens of said first cylindrical lens array and that of each lens of said second cylindrical lens array are substantially coincident with each other.

49. A projector comprising:
   means for projecting an image; and
   a screen for receiving an image, said screen having a sheet in which a lens array is formed wherein said lens array is disposed in the interior of said sheet and surroundings of each lens of said lens array are covered with the material constituting said sheet and wherein the refractive index of said lens array is greater than that of said sheet.

50. A projector according to claim 49, wherein said projecting means comprises at least three projecting optical systems for projecting each image of red, green and blue on to said screen.

51. A lens sheet having:
   a lens array; and
   optical means for bringing a convergent position when a parallel light beam is incident on said lens array nearer to said lens array.

52. A lens sheet according to claim 51, wherein said optical means is a second lens array and each lens of said second lens array is arranged corresponding to each lens of said lens array.

53. A lens sheet according to claim 52, wherein said lens array is disposed at a focal position of said second lens array.

54. A projector having:
means for projecting an image; and
a screen for receiving said image, said screen having a lens array and optical means, wherein said optical means brings a convergent position when a parallel light beam is incident on said lens array nearer to said lens array.

55. A projector according to claim 54, wherein said projecting means comprises at least three projecting optical systems for projecting each image of red, green and blue onto said screen.

* * * * *